United States Patent
Hillan et al.

(10) Patent No.: US 9,374,134 B2
(45) Date of Patent: Jun. 21, 2016

(54) METHODS AND APPARATUS FOR IMPROVING THE IDENTIFICATION OF MULTIPLE NFC-A DEVICES

(71) Applicant: QUALCOMM Incorporated, San Diego, CA (US)

(72) Inventors: John Hillan, Farnborough (GB); Dubai Chingalande, Farnborough (GB); Jeremy R. O'Donoghue, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 13/745,391

(22) Filed: Jan. 18, 2013

(65) Prior Publication Data

US 2013/0203351 A1 Aug. 8, 2013

Related U.S. Application Data

(60) Provisional application No. 61/594,270, filed on Feb. 2, 2012.

(51) Int. Cl.
| | |
|---|---|
| H04B 5/00 | (2006.01) |
| G06F 13/374 | (2006.01) |
| G06F 13/376 | (2006.01) |
| G06K 7/10 | (2006.01) |

(52) U.S. Cl.
CPC .............. *H04B 5/00* (2013.01); *G06K 7/10029* (2013.01)

(58) Field of Classification Search
CPC .................................. H04B 1/59; G06K 17/00
See application file for complete search history.

(56) References Cited

U.S. PATENT DOCUMENTS

| 7,209,706 | B2 * | 4/2007 | Fujii et al. .................... 455/41.2 |
| 7,734,307 | B2 | 6/2010 | Dawidowsky |
| 8,068,011 | B1 | 11/2011 | Sajadi et al. |
| 8,213,860 | B2 | 7/2012 | Teruyama et al. |
| 2002/0130766 | A1 | 9/2002 | Hulvey |

(Continued)

FOREIGN PATENT DOCUMENTS

| EP | 1431904 A2 | 6/2004 |
| EP | 1845694 A1 | 10/2007 |
| EP | 2365676 A1 | 9/2011 |

OTHER PUBLICATIONS

NFCForum-TS-DigitalProtocol-1.0.*

(Continued)

*Primary Examiner* — Cindy Trandai
(74) *Attorney, Agent, or Firm* — Joseph Hanasz

(57) ABSTRACT

Aspects disclosed herein relate to improving technology detection and collision resolution among multiple NFC devices using a NFC type-A RF technology. In one example, a communications device is equipped to determine that a first device sensing response message includes one or more collisions, identify a first remote NFC device of the plurality of remote NFC devices by performing collision resolution on the first device sensing response message, transmit a sleep request message to the first remote NFC device that prohibits the first remote NFC device from responding to a first device sensing request message and the first device sensing request message, receive a second device sensing response message that includes collisions among the plurality of remote NFC devices, and identify a second remote NFC device of the plurality of remote NFC devices by performing collision resolution on the second device sensing response message.

36 Claims, 7 Drawing Sheets

(56) References Cited

U.S. PATENT DOCUMENTS

| | | |
|---|---|---|
| 2005/0077356 A1* | 4/2005 | Takayama .......... G06K 7/10237 235/451 |
| 2008/0137862 A1 | 6/2008 | Morita et al. |
| 2009/0180451 A1 | 7/2009 | Alpert et al. |
| 2010/0026454 A1 | 2/2010 | Rowse et al. |
| 2010/0084918 A1* | 4/2010 | Fells et al. ...................... 307/32 |
| 2010/0304770 A1 | 12/2010 | Wietfeldt et al. |
| 2011/0159816 A1 | 6/2011 | Takayama |
| 2012/0045989 A1 | 2/2012 | Suumaki et al. |
| 2012/0077584 A1 | 3/2012 | Sarmenta |
| 2012/0206391 A1* | 8/2012 | Kim et al. ..................... 345/173 |
| 2012/0329405 A1* | 12/2012 | Lee et al. ........................ 455/73 |

OTHER PUBLICATIONS

SSD by ETSI TS 102 V1.1.1 (Mar. 2003).*
Hillan J "Correction to NFC-A Collision Resolution Activity", Feb. 3, 2012, XP055059795, Retrieved from the Internet: URL: http://www.nfc -forum.org/apps/group_public/download.php/11097/Qualcomm%20Input%20Paper%20on%20NFC-A%20Collision%20Resolution.docx [retrieved on Apr. 16, 2013].
International Search Report and Written Opinion—PCT/US2013/024385—ISA/EPO—Oct. 15, 2013.
NFC Forum: "NFC Digital Protocol, Technical Specification, Digital 1.0", NFC Forum, Nov. 17, 2010, pp. 1-175, XP002712429, Wakefield, MA, USA, Retrieved from the Internet: URL:http://cwi.unik.no/images/NFC_forum_digital_protocol.pdf [retrieved on Sep. 6, 2013], p. 25-p. 34.

* cited by examiner

METHODS AND APPARATUS FOR IMPROVING THE IDENTIFICATION OF MULTIPLE NFC-A DEVICES

CLAIM OF PRIORITY UNDER 35 U.S.C. §119

The present Application for Patent claims priority to Provisional Application No. 61/594,270 entitled "METHODS AND APPARATUS FOR IMPROVING THE IDENTIFICATION OF MULTIPLE NFC-A DEVICES" filed Feb. 2, 2012, and assigned to the assignee hereof and hereby expressly incorporated by reference herein.

BACKGROUND

The disclosed aspects relate generally to communications between and/or within devices and specifically to methods and systems for improving technology detection and collision resolution among multiple near field communication (NFC) devices using a NFC type-A radio frequency (RF) technology.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, NFC, etc.

The NFC Forum Activity specification defines a technology detection procedure to use when resolving multiple devices, tags, and cards that use NFC Type A (NFC-A) radio frequency (RF) technology. The process includes performance of a logical loop that is executed multiple times so as to differentiate each device in an operating volume. Further, the process includes a device sensing response (SENS_RES) to a device sensing request poll command (SENS_REQ). For NFC-A RF technologies, the device sensing response may indicate to the polling device information it may use to perform collision resolution. However, where there are multiple remote NFC devices (e.g., readers/writers, tags, cards, peer devices, etc.) in the operating volume, the device sensing response itself may suffer from collisions. The NFC Forum Activity Specification, as currently written, has the polling device perform collision resolution based on the originally received device sensing response. When the original device sensing response continues to be used for every iteration through the collision resolution process, a single device detect request (e.g., SDD_REQ) and/or a device sensing request generated in response to analysis of the received device sensing response can only be the best interpretation, by the polling device, of what combination of devices caused the original device sensing response collisions. In such an aspect, the polling device may be unable to determine what has been sensed if there are collisions in certain bytes of the SENS_RES. As such, the device sensing response used to remove ambiguity during the technology detection procedure is currently the response that may be the most ambiguous.

Thus, improved apparatus and methods for improving technology detection among multiple NFC-A devices may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

In accordance with one or more embodiments and corresponding disclosure thereof, various aspects are described in connection with improving technology detection and collision resolution among multiple NFC devices using a NFC type-A RF technology. In an example, a communications device is configured to determine that a first device sensing response message includes one or more collisions, identify a first remote NFC device of the plurality of remote NFC devices by performing collision resolution on the first device sensing response message, transmit a sleep request message to the first remote NFC device that prohibits the first remote NFC device from responding to a first device sensing request message and the first device sensing request message, receive a second device sensing response message that includes collisions among the plurality of remote NFC devices, and identify a second remote NFC device of the plurality of remote NFC devices by performing collision resolution on the second device sensing response message.

According to related aspects, a method for improving technology detection and collision resolution among multiple NFC devices using a NFC type-A RF technology is provided. The method can include determining that a first device sensing response message includes one or more collisions among a plurality of remote NFC devices. Further, the method can include identifying a first remote NFC device of the plurality of remote NFC devices by performing collision resolution on the first device sensing response message. Further, the method can include transmitting a sleep request message to the first remote NFC device that prohibits the first remote NFC device from responding to a first device sensing request message. Further, the method can include transmitting the first device sensing request message. Further, the method can include receiving a second device sensing response message that includes collisions among the plurality of remote NFC devices. Moreover, the method may include identifying a second remote NFC device of the plurality of remote NFC devices by performing collision resolution on the second device sensing response message.

Another aspect relates to a communications apparatus enabled to improve technology detection and collision resolution among multiple NFC devices using a NFC type-A RF technology. The communications apparatus can include means for determining that a first device sensing response message includes one or more collisions among a plurality of remote NFC devices. Further, the communications apparatus can include means for identifying a first remote NFC device of the plurality of remote NFC devices by performing collision resolution on the first device sensing response message. Further, the communications apparatus can include means for transmitting a sleep request message to the first remote NFC device that prohibits the first remote NFC device from responding to a first device sensing request message. Further, the communications apparatus can include means for transmitting the first device sensing request message. Further, the communications apparatus can include means for receiving a second device sensing response message that includes collisions among the plurality of remote NFC devices. Moreover, the communications apparatus can include means for identifying a second remote NFC device of the plurality of remote NFC devices by performing collision resolution on the second device sensing response message.

Another aspect relates to a communications apparatus. The apparatus can include a transceiver, a memory, a processor coupled to the memory, and a NFC technology detection module coupled to at least one of the memory or processor. The NFC technology detection module may be configured to determine that a first device sensing response message includes one or more collisions among a plurality of remote NFC devices, identify a first remote NFC device of the plurality of remote NFC devices by performing collision resolution on the first device sensing response message. Further, the transceiver may be configured to transmit a sleep request message to the first remote NFC device that prohibits the first remote NFC device from responding to a first device sensing request message, transmit the first device sensing request message, and receive a second device sensing response message that includes collisions among the plurality of remote NFC devices. Moreover, the NFC technology detection module may further be configured to identify a second remote NFC device of the plurality of remote NFC devices by performing collision resolution on the second device sensing response message.

Still another aspect relates to a computer program product, which can have a computer-readable medium including code for determining that a first device sensing response message includes one or more collisions among a plurality of remote NFC devices. Further, the computer-readable medium may include code for identifying a first remote NFC device of the plurality of remote NFC devices by performing collision resolution on the first device sensing response message. Further, the computer-readable medium may include code for transmitting a sleep request message to the first remote NFC device that prohibits the first remote NFC device from responding to a first device sensing request message. Further, the computer-readable medium may include code for transmitting the first device sensing request message. Further, the computer-readable medium may include code for receiving a second device sensing response message that includes collisions among a plurality of remote NFC devices that does not include the first remote NFC device. Moreover, the computer-readable medium can include code for identifying a second remote NFC device of the plurality of remote NFC devices by performing collision resolution on the second device sensing response message.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

Generally, during a technology detection procedure a polling device may receive device sensing responses from multiple remote NFC devices within an operating volume that collide with each other. A collision resolution loop may be used to attempt to identify each remote NFC device that provided a device sensing response. The collision resolution process may continue until each of the multiple remote NFC devices has been separately identified. During each iteration of the collision resolution loop, each resolved NFC device may be placed in a sleep mode, a new device sensing request may be sent by the polling device, and new device sensing responses may be received from any unresolved and awake NFC devices. The newly received device sensing response may include fewer collisions than the previously received device sensing response because the NFC devices in sleep mode do not provide a device sensing response. The collision resolution loop may continue using the newly received device sensing response during each collision resolution loop iteration until no additional collisions are detected.

Figure 1:
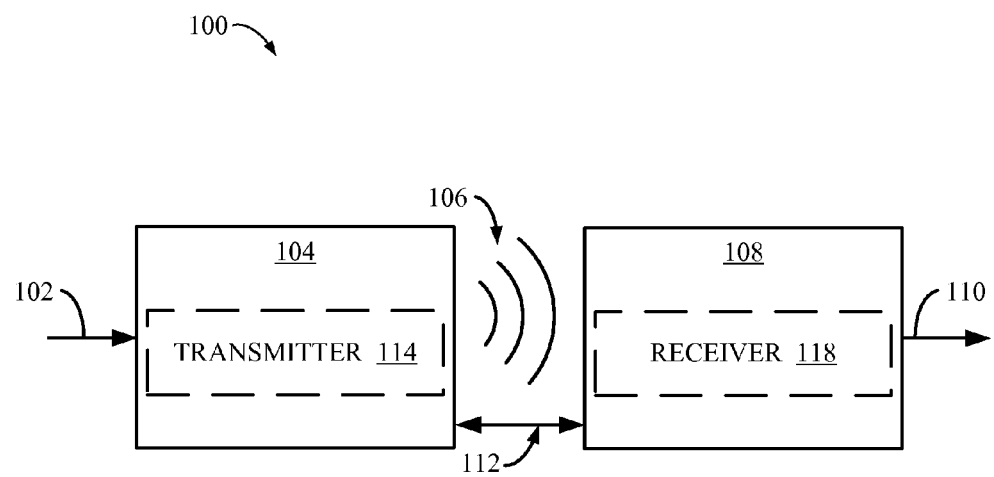
FIG. 1 is a block diagram of a wireless communication system, according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In an exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
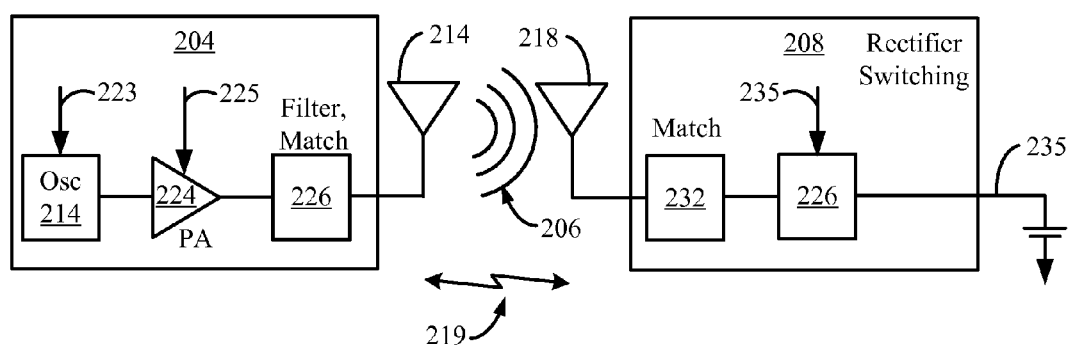
FIG. 2 is a schematic diagram of a wireless communication system, according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, Zigbee, cellular, etc).

Figure 3:
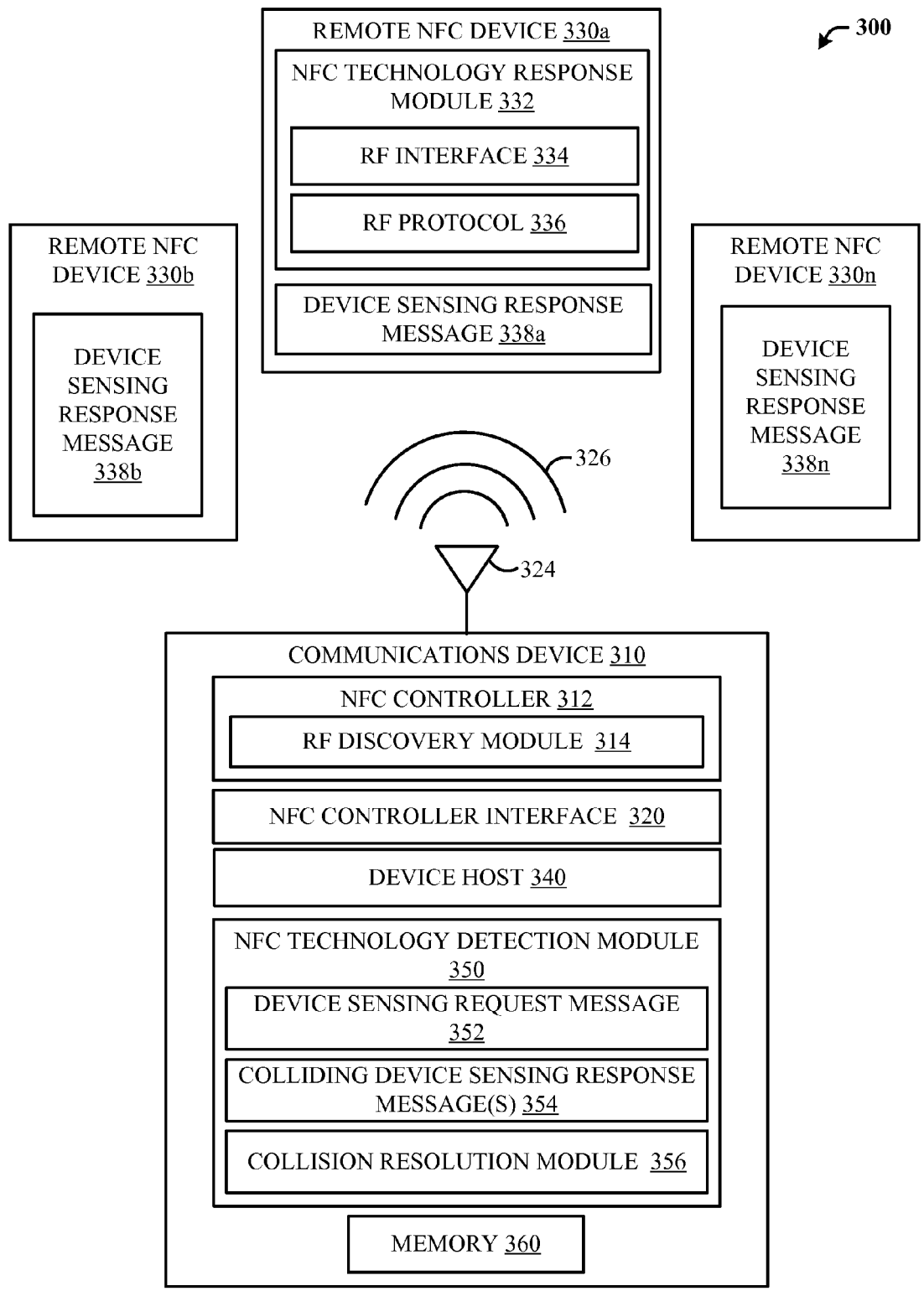
FIG. 3 is a block diagram of a NFC environment, according to an aspect.

With reference to FIG. 3, a block diagram of a communication network 300 according to an aspect is illustrated. Communication network 300 may include communications devices 310 which, through antenna 324, may be within an operating volume of two or more remote NFC devices (330a, 330b, 330n). Each NFC device (310, 330a, 330b, 330n) in the communication network 300 may use one or more NFC RF technologies 326 (e.g., NFC-A, NFC-B, NFC-F, etc.). In an aspect, communications device 310 may use NFC technology detection module 350 to poll the operating volume to attempt to detect the presence of and identify each of the remote NFC devices (330a, 330b, 330n). Each remote NFC device (330a, 330b, 330n) may be configured to respond with a device sensing response message (338a, 338b, 338n) to the communications device 310 polling using NFC technology response module 332 through one or more RF interfaces 334 using one or more RF protocols 336. In an aspect, each of the remote NFC devices is configured to use a NFC-A RF technology when transmitting the device sensing response messages (338a, 338b, 338n). In another aspect, communications device 310 may be configured to be connected to an access network and/or core network (e.g., a CDMA network, a GPRS network, a UMTS network, and other types of wireline and wireless communication networks). In an aspect, remote NFC devices (330a, 330b, 330n) may include but are not limited to a remote NFC tag, a reader/writer device, a peer initiator device, a remote peer target device, etc.

Communications device 310 may include NCI 320. In an aspect, NCI 320 may be configured to enable communications between a NFC enabled antenna 324 and NFC controller 312.

Communications device 310 may include a NFC controller (NFCC) 312. In an aspect, NFCC 312 may include RF discovery module 314. RF discovery module 314 may be configured to perform RF discovery using a discovery process. One aspect of the discovery process may include polling for the presence of one or more remote NFC devices (330a, 330b, 330n) configured to communicate using a NFC-A RF technology. DH 340 may be configured to generate a command to prompt NFCC 312 to perform various functions associated with RF discovery.

Communications device 310 may include NFC technology detection module 350. NFC technology detection module 350 may be configured to generate and communicate a device sensing request message 352. In an aspect, the device sensing request message 352 may be a SENS_REQ message as defined in the NFC Forum Digital Protocol specification. NFC technology detection module 350 may receive one or more device sensing response messages (338a, 338b, 338n) from one or more remote NFC devices (330a, 330b, 330n) resulting in a received device sensing response that includes one or more collisions 354. In an aspect, each device sensing response message (338a, 338b, 338n) may be a SENS_RES message as defined in the NFC Forum Digital Protocol specification. NFC technology detection module 350 may further include collision resolution module 356 that may be configured to analyze the received device sensing response that includes one or more collisions 354. Although FIG. 3 depicts NFC technology detection module 350 is a separate module, one of ordinary skill in the art would appreciate that the functionality associated with NFC technology detection module 350 may be included within one or more components, such as but not limited to, NFCC 312, DH 340, etc.

Communications device 310 may include further include memory 360 that may be configured to store one or more parameters received in the one or more received device sensing response that include one or more collisions 354. In another aspect, each newly received device sensing response 354 may be stored in memory 360 by writing over and/or deleting a previously stored device sensing response 354.

In one operational aspect, collision resolution module 356 may identify one (e.g., 330a) of the multiple remote NFC devices (330a, 330b, 330n) and communications device 310 may transmit a sleep request to the identified remote NFC device (e.g., 330a). In an aspect, the device sleep request message may be a SLP_REQ message as defined in the NFC Forum Digital Protocol specification. Thereafter, NFC technology detection module 350 may transmit another device sensing request message. As one of the multiple remote NFC devices was prompted into a sleep mode by the sleep request message, a subsequently received device sensing response 354 may include no more collisions than a previously received device sensing response, and may include fewer collisions 354. Thereafter, collision resolution module 356 may use the subsequently received device sensing response 354 to perform collision resolution. In other words, each time through the NFC collision resolution loop, there may be one fewer device sensing response for a remote NFC device (330a, 330b, 330n) (e.g., peer device, reader, writer, tag, card, etc.) that responds to the device sense request message 352. As such, the most recently received device sensing response 354 is at least no worse than any previously received device sensing responses 354, and in fact, may be better because it may include fewer collisions and less ambiguity each iteration. Continuing the operational aspect described above, on the final iteration through the NFC collision resolution loop, because only one remote NFC device (e.g., 330n) may be awake to respond, the final device sensing response message 354 may be collision free.

Therefore, a system and method is disclosed to provide improved technology detection for communications device 310 with multiple remote NFC devices 330a, 330b, 330n.

Figure 4:
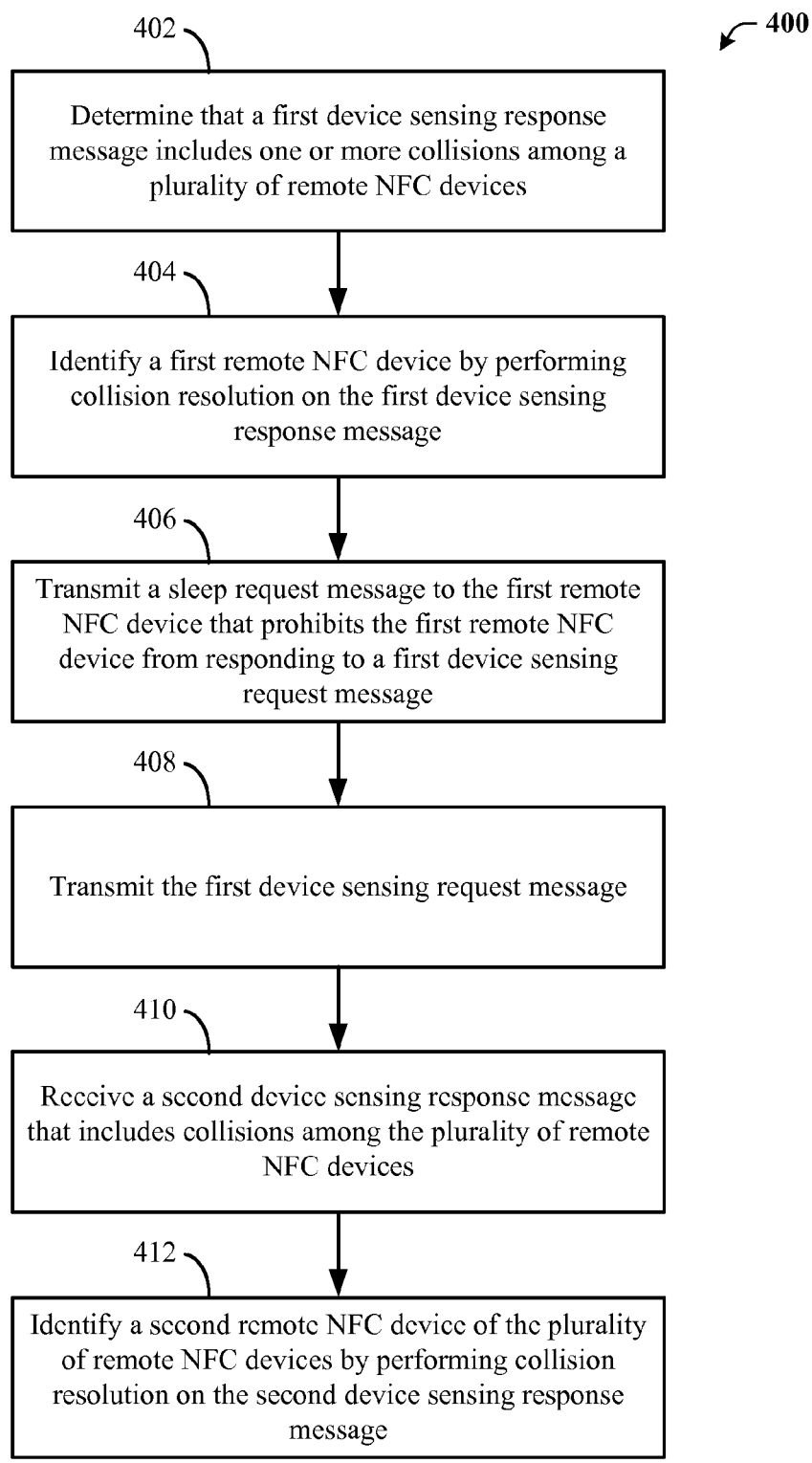
FIG. 4 is a flowchart describing an example of improving technology detection among multiple NFC-A devices, according to an aspect.
Figure 5:
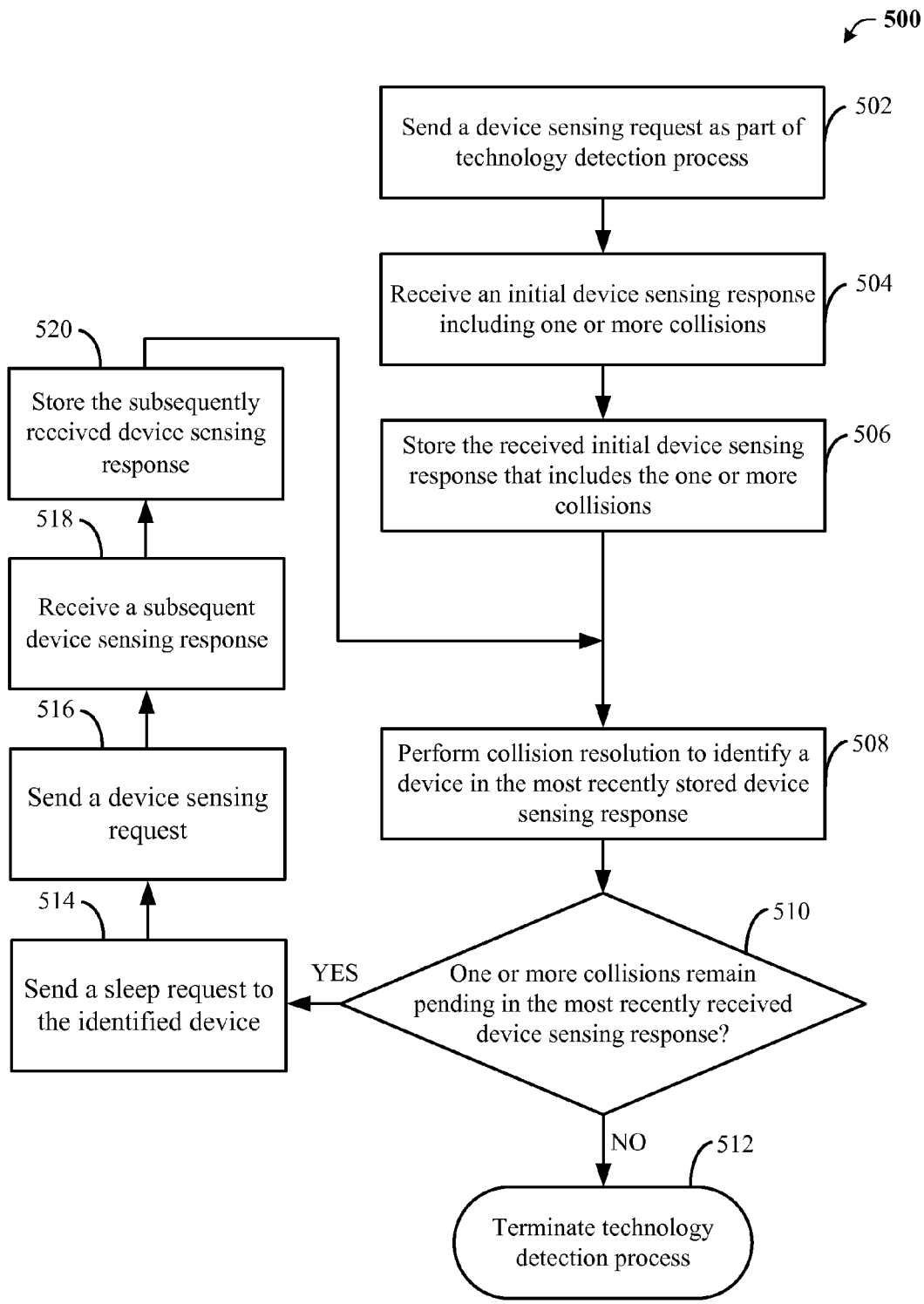
FIG. 5 is a flowchart describing another example of improving technology detection among multiple NFC-A devices, according to an aspect.

FIGS. 4-5 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 4 depicts an example flowchart describing a process 400 for improving NFC technology detection in a communications environment in which multiple remote NFC devices are present.

At block 402, a NFC device may determine that a first device sensing response message includes one or more collisions among a plurality of remote NFC devices. In an aspect, the first device sensing response may be obtained by transmitting a device sensing request message as part of a technology detection process, and receiving the first device sensing response message in response to the first device sensing request message. In an aspect, the first device sensing response by be stored by the NFC device. In an aspect, each of the plurality of remote NFC devices is configured to use NFC-A radio RF technology. In another aspect, the plurality of remote NFC devices may include any combination of a reader device, a writer device, a tag, a card, and a peer device, etc.

At block 404, the NFC device may identify a first remote NFC device of the plurality of remote NFC devices by performing collision resolution on the first device sensing response message. As used herein, a first remote NFC device merely refers to one of the multiple remote NFC devices that have been identified. One of ordinary skill in the art will appreciate that application of a "first" label only occurs in the context of identification of a remote NFC device and does not correspond to any ordering, ranking, and/or characterizing the multiple remote NFC devices. In an aspect, single device detection communications, used as part of technology detection, may include a NFCID that may identify each remote NFC device.

At block 406, the NFC device may transmit a sleep request message to the first remote NFC device that prohibits the first remote NFC device from responding to a first device sensing request message. In an aspect, the sleep request message includes a SLP_REQ message as defined in the NFC Forum Digital Protocol specification.

At block 408, the NFC device may transmit the first device sensing request message. In an aspect, the first device sensing request message includes a SENS_REQ message as defined in the NFC Forum Digital Protocol specification.

At block 410, the NFC device may receive a second device sensing response message that includes collisions among the plurality of remote NFC devices. In an aspect, the first and second device sensing response messages may be SENS_RES messages as defined in the NFC Forum Digital Protocol specification. In an aspect, the second device sensing response message may be stored on the NFC device. In one such aspect, the second device sensing response message may be stored so as to overwrite the first device sensing response message. In another aspect, the second device sensing response message may be stored with the first device sensing response message. Further, subsequent device sensing response message may be stored with the first and second device sensing response message and the NFC device may analyze the stored messages to identify or more other remote NFC devices of the plurality of remote NFC devices.

At block 412, the NFC device may identify a second remote NFC device of the plurality of remote NFC devices by performing collision resolution on the second device sensing response message. As noted above with respect to the use of "first," "second" as used herein merely refers to another one of the multiple remote NFC devices that have been identified. One of ordinary skill in the art will appreciate that application of a "second" label only occurs in the context of identification of a remote NFC device and does not correspond to any ordering, ranking, and/or characterizing the multiple remote NFC devices.

FIG. 5 depicts an example flowchart describing another process 500 for improving RF discovery for peer mode passive communications.

At block 502, a NFC device may send a device sensing request (e.g., SENS_REQ) as part of a technology detection process. As used herein, the technology detection process assists the NFC device in detecting and identifying one or more remote NFC devices within an operating volume of the NFC device.

At block 504, the NFC device may receive an initial device sensing response (e.g., SENS_RES) that includes one or more collisions. As used herein, a collision refers to an indication in the message that multiple remote NFC devices have responded in such a manner as to result in both a "0" and a "1" bit be received for a single value. In other words, one remote NFC device may include a "0" at a location within its NFCID while another remote NFC device may include a "1" at the same location within its own NFCID.

At block 506, the NFC device may store the received initial device sensing response. In aspect, the NFC device may store received device sensing responses on non-volatile (NV) memory available on a NFC controller. In another aspect, the NFC device may store received device sensing responses on memory (e.g., memory 608) available in the NFC device.

At block 508, the NFC device may perform collision resolution to identify one of the devices that sent a device sensing response.

At block 510, the NFC device determines whether there are any collisions remaining in the most recently analyzed device sensing response. If at block 510, the NFC device determines that no collisions remain pending, then at block 512, the collision resolution process may successfully terminate.

By contrast, if at block 510, the NFC device determines that one or more collisions remain pending, then at block 514, the NFC device may send a sleep request to the remote NFC device identified through the most recent collision resolution.

At block 516, the NFC device may send a device sensing request to attempt to detect and identify one or more remote NFC devices that remain unidentified in the operating volume.

At block 518, the NFC device may receive a subsequent device sensing response. As used herein, a subsequent device sensing response may include any device sensing device that is received after the initial device sensing response has been received.

At block 520, the NFC device may store the subsequently received device sensing response. In an aspect, each subsequently received device sensing response may be saved so as to overwrite a previously saved device sensing response. In another aspect, each of the received device sensing responses may be saved. In such an aspect, the set of saved device sensing responses may generate a history of potentially progressively less ambiguous device sensing responses. Further, in such an aspect, the history may be analyzed to determine one or more other remote NFC devices within the operating volume. After the most recently received device sensing response has been received, the process may return to block 508 for another iteration of collision resolution to be performed.

Figure 6:
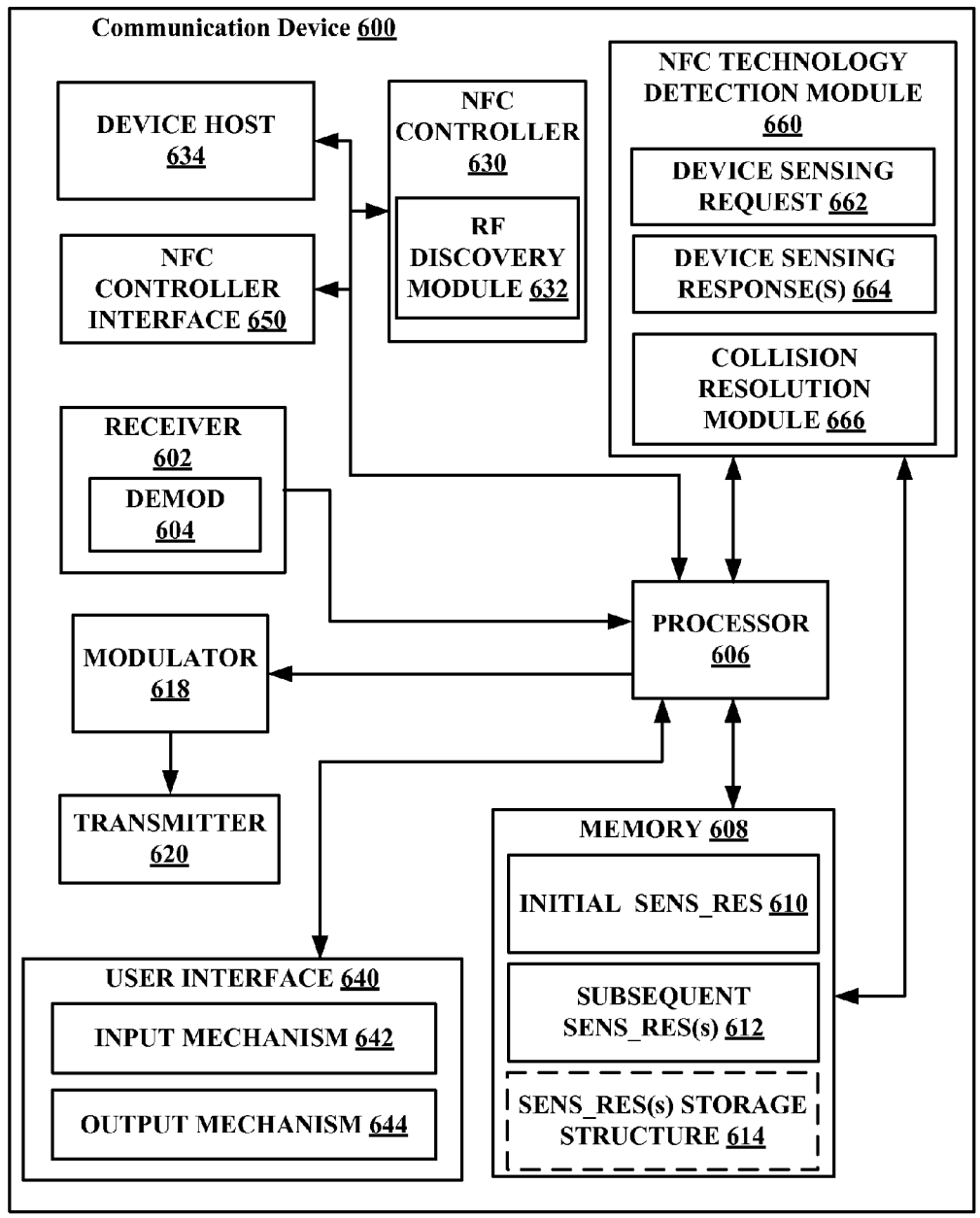
FIG. 6 is a functional block diagram of an example architecture of a communications device, according to an aspect.

While referencing FIG. 3, but turning also now to FIG. 6, an example architecture of communications device 600 is illustrated. As depicted in FIG. 6, communications device 600 comprises receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of communications device 600, and/or a processor that both analyzes information received by receiver 602, generates information for transmission by transmitter 620, and controls one or more components of communications device 600. Further, signals may be prepared for transmission by transmitter 620 through modulator 618 which may modulate the signals processed by processor 606.

Communications device 600 can additionally comprise memory 608 that is operatively coupled to various components, such as but not limited processor 606 and that can store data to be transmitted, received data, information related to available channels, TCP flows, data associated with analyzed signal and/or interference strength, information related to an assigned channel, power, rate, or the like, and any other suitable information for assisting in NFC peer mode connection establishment. In an aspect, memory 608 may include an initially stored device sensing response 610. In an aspect, memory may further include one or more subsequently received device sensing responses 612.

In an optional aspect, memory 608 may further store each received device sensing response in a device sensing response storage structure 614 (e.g., a table, matrix, etc.). In such an optional aspect, NFC technology detection module 660 may be configured to analyzing the storage structure 614 after collision resolution is complete to identify exact device sensing response values for each device. For example, after collision resolution is preformed for all remote NFC devices in an operating volume, storage structure 614 may include example values as provided in Table 1.

TABLE 1

Example SENS_RESs stored during Collision Resolution

| SENS_RES[0] | 000*0000 00001*00 |
| SENS_RES[1] | 00000000 00001*00 |
| SENS_RES[2] | 00000000 00001100 |

In Table 1, a "*" indicates a bit location that experienced a collision. Continuing the above optional aspect, a cleaner device sensing response (SENS_RES[1]) may be inferred from the last device sensing response (SENS_RES[2]). Because SENS_RES[2] has a "1" value at the only collision byte location in SENS_RES[1], it can be inferred that the bit value is a "0" for SENS_RES[1]. Similarly, because SENS_RES[1] includes a "0" as the fourth bit, it can be inferred that the bit value is "1" for SENS_RES[0]. As such, cleaner device sensing responses may be inferred for each device through analysis of storage structure 614.

Further, processor 606, receiver 602, transmitter 620, device host 634, NFCC 630, and/or NFC technology detection module 660 can provide means for determining that a first device sensing response message includes one or more collisions among a plurality of remote NFC devices, means for identifying a first remote NFC device of the plurality of remote NFC devices by performing collision resolution on the first device sensing response message, means for transmitting a sleep request message to the first remote NFC device that prohibits the first remote NFC device from responding to a first device sensing request message, means for transmitting the first device sensing request message, means for receiving a second device sensing response message that includes collisions among the plurality of remote NFC devices, and means for identifying a second remote NFC device of the plurality of remote NFC devices by performing collision resolution on the second device sensing response message.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory. In an aspect, memory 608 may further include one or more received device sensing responses (SENS_RES) received as part of a collision resolution process. In an aspect, an initially received device sensing response 610 may be overwritten/replaced by a subsequent device sensing response 612. In another aspect, one or more subsequently received device sensing responses 612 may be stored with the initially received device sensing response 610.

Communications device 600 may include a NFC controller 630 and device host 634. In an aspect, NFCC 630 may include RF discovery module 632. RF discovery module 632 may be configured to perform a discovery process. One aspect of the discovery process may include polling for the presence of one or more remote NFC devices configured to communicate using a NFC-A RF technology. DH 634 may be configured to generate a command to prompt NFCC 630 to perform various functions associated with RF discovery.

In another aspect, communications device 600 may include NCI 650. In an aspect, NCI 650 may be configured to enable communications between a NFC enabled antenna (e.g., 602, 620), NFC controller 630 and DH 634. NCI 650 may be configured to function in a listening mode and/or a polling mode.

In another aspect, communications device 600 may include NFC technology detection module 660. NFC technology detection module 660 may be configured to generate and communicate a device sensing request message 662. In an aspect, the device sensing request message 662 may be a SENS_REQ message as defined in the NFC Forum Digital Protocol specification. NFC technology detection module 660 may receive one or more device sensing response messages from one or more remote NFC devices resulting in a received device sensing response that includes one or more collisions 664. In an aspect, each device sensing response message may be a SENS_RES message as defined in the NFC Forum Digital Protocol specification. NFC technology detection module 660 may further include collision resolution module 666 that may be configured to analyze the received device sensing response that includes one or more collisions 664. Although FIG. 6 detects NFC technology detection module 660 is a separate module, one of ordinary skill in the art would appreciate that the functionality associated with NFC technology detection module 660 may be included within one or more components, such as but not limited to, NFCC 630, DH 634, etc. In another aspect, NFC technology detection module 660 configured to perform NFC technology detection processes described with respect to FIGS. 4-5.

Additionally, communications device 600 may include user interface 640. User interface 640 may include input mechanisms 642 for generating inputs into communications device 600, and output mechanism 644 for generating information for consumption by the user of the communications device 600. For example, input mechanism 642 may include a mechanism such as a key or keyboard, a mouse, a touchscreen display, a microphone, etc. Further, for example, output mechanism 644 may include a display, an audio speaker, a haptic feedback mechanism, a Personal Area Network (PAN) transceiver etc. In the illustrated aspects, the output mechanism 644 may include a display configured to present media content that is in image or video format or an audio speaker to present media content that is in an audio format.

Figure 7:
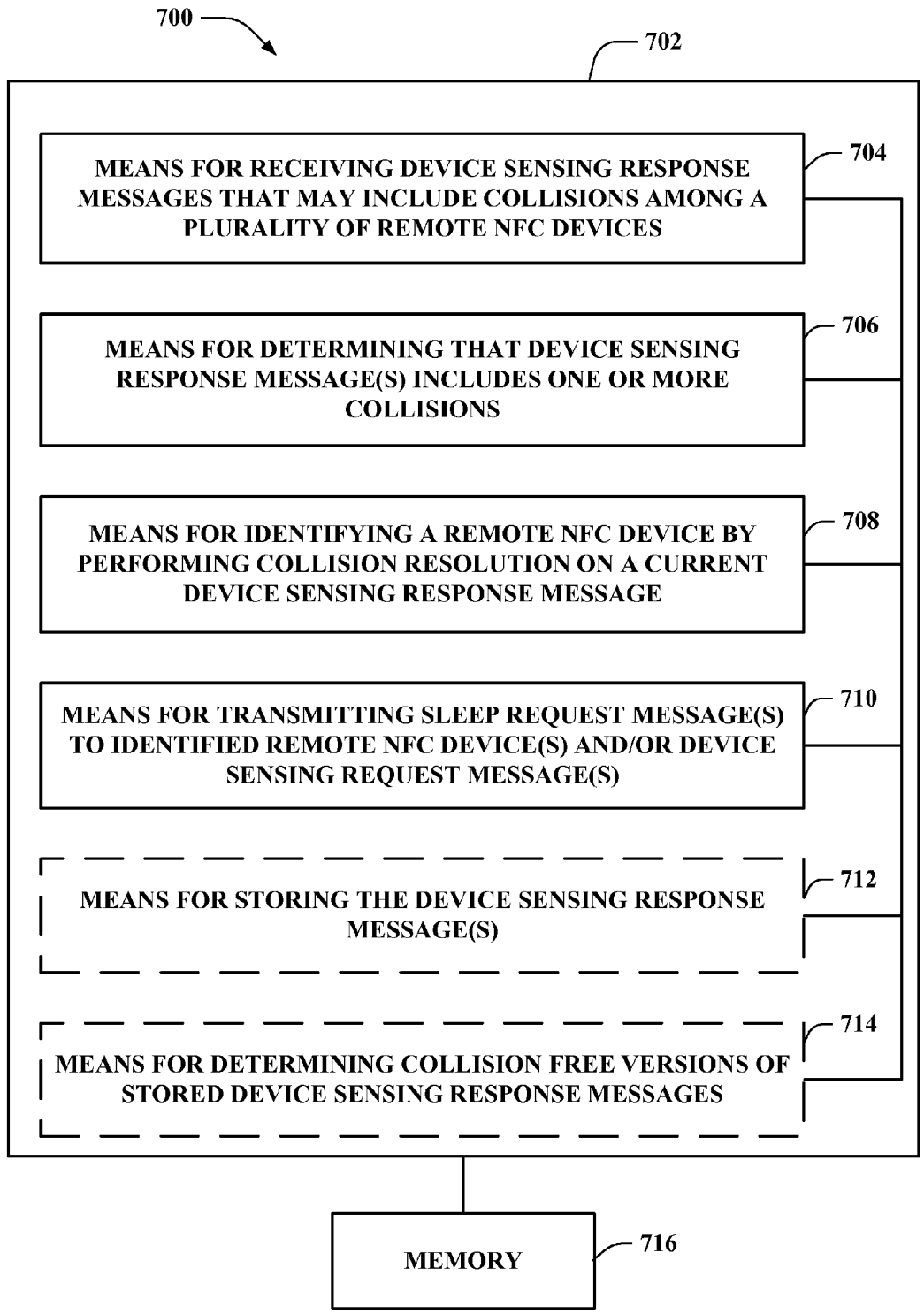
FIG. 7 is a functional block diagram of an example communication system for improving technology detection among multiple NFC-A devices, according to an aspect.

FIG. 7 depicts another depicts a block diagram of an exemplary communication system 700 configured to improve technology detection and collision resolution among multiple NFC devices using a NFC type-A RF technology, according to an aspect. For example, system 700 can reside at least partially within a communications device (e.g., communications device 600). It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction.

For instance, logical grouping 702 can include an electrical component that may provide means for receiving a device sensing response message that may include collisions among a plurality of remote NFC devices 704. For example, in an aspect, the means for receiving 704 can include receiver 602, DH 634, NFCC 630, NFC technology detection module 660, and/or processor 606 of communications device 600. In an aspect, the means for receiving 704 may be configured to receive a first device sensing response message in response. In an aspect, the means for receiving 704 may be configured to receive a second device sensing response message that includes collisions among the plurality of remote NFC devices. In an aspect, the means for receiving 704 may be configured to receive a collision free device sensing response message. In an aspect, the means for receiving 704 may be configured to receive one or more messages as part of single device detection communications. In an aspect, the device sensing response messages may be SENS_RES messages as defined in the NFC Forum Digital Protocol specification. In another aspect, each of the plurality of remote NFC devices may be configured to use NFC-A RF technology. In another aspect, the remote NFC devices may be a reader device, a writer device, a tag, a card, and a peer device, etc.

Further, logical grouping 702 can include an electrical component that may provide means for determining that a device sensing response message includes one or more collisions among a plurality of remote NFC devices 706. For example, in an aspect, the means for determining 706 can include DH 634, NFCC 630, NFC technology detection module 660, and/or processor 606 of communications device 600.

Further, logical grouping 702 can include an electrical component that may provide means for identifying a remote NFC device by performing collision resolution on the device sensing response message 708. For example, in an aspect, the means for identifying 708 can include DH 634, NFCC 630, NFC technology detection module 660, and/or processor 606 of communications device 600. In an aspect, the means for identifying 708 may be configured to identify a first remote NFC device of the plurality of remote NFC devices by performing collision resolution on a first device sensing response message. In an aspect, the means for identifying 708 may be configured to identify a second remote NFC device of the plurality of remote NFC devices by performing collision resolution on a second device sensing response message.

Moreover, logical grouping 702 can include an electrical component that may provide means for transmitting sleep request messages to identified remote NFC devices and/or device sensing request messages 710. For example, in an aspect, the means for transmitting 710 can include transmitter 620, DH 634, NFCC 630, NFC technology detection module 660, and/or processor 606 of communications device 600. In an aspect, the means for transmitting 710 may be configured to transmit a sleep request message to an identified remote NFC device. In an aspect, the means for transmitting 710 may be configured to transmit a first device sensing request message as part of a technology detection process. In an aspect, the means for transmitting 710 may be configured to transmit a second device sensing request message. In an aspect, the means for transmitting 710 may be configured to transmit one or more messages as part of single device detection communications. In an aspect, the sensing request message may be a SENS_REQ message as defined in the NFC Forum Digital Protocol specification. In another aspect, the sleep request message may be a SLP_REQ message as defined in the NFC Forum Digital Protocol specification.

In an optional aspect, logical grouping 702 can include an electrical component that may provide means for storing device sensing response messages in a storage structure 712. For example, in an aspect, the means for storing 712 can include memory 608 of communications device 600. In an aspect, the means for storing 712 may be configured to store a first device sensing response message in a first location in a storage structure. In an aspect, the means for storing 712 may be configured to store a second device sensing response message in a second location in the storage structure. In an aspect, the means for storing 712 may be configured to overwrite the first device sensing response message with the second device sensing response message.

In another optional aspect, logical grouping 702 can include an electrical component that may provide means for determining collision free versions of the first and second device sensing response messages by analyzing the storage structure using the received collision free device sensing response message 714. For example, in an aspect, the means for determining 714 can include DH 634, NFCC 630, NFC technology detection module 660, and/or processor 606 of communications device 600.

Additionally, system 700 can include a memory 716 that retains instructions for executing functions associated with the electrical components 704, 706, 708, 710, 712, and 714, stores data used or obtained by the electrical components 704, 706, 708, 710, 712, 714, etc. While shown as being external to memory 716, it is to be understood that one or more of the electrical components 704, 706, 708, 710, 712, and 714 may exist within memory 716. In one example, electrical components 704, 706, 708, 710, 712, and 714 can include at least one processor, or each electrical component 704, 706, 708, 710, 712, and 714 can be a corresponding module of at least one processor. Moreover, in an additional or alternative example, electrical components 704, 706, 708, 710, 712, and 714 may be a computer program product including a computer readable medium, where each electrical component 704, 706, 708, 710, 712, and 714 may be corresponding code. In an aspect, for example, memory 716 may be the same as or similar to memory 608 (FIG. 6). In another aspect, memory 716 may be associated with DH 634, NFCC 630, and/or NFC technology detection module 660.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
   determining that a first device sensing response message includes one or more collisions among a plurality of remote near field communication (NFC) devices;
   identifying a first remote NFC device of the plurality of remote NFC devices by performing collision resolution on the first device sensing response message;
   transmitting a sleep request message to the first remote NFC device, which causes the first remote NFC device to transition to a sleep state that prohibits the first remote NFC device from responding to a first device sensing request message;
   transmitting the first device sensing request message;
   receiving a second device sensing response message that includes collisions among the plurality of remote NFC devices;
   identifying a second remote NFC device of the plurality of remote NFC devices by performing collision resolution on the second device sensing response message;
   storing the first device sensing response message in a first location in a storage structure, and the second device sensing response message in a second location in the storage structure;
   receiving a collision free device sensing response message; and
   determining collision free versions of the first and second device sensing response messages by analyzing the first device sensing response message in the first location and the second device sensing response message in the second location in the storage structure using the received collision free device sensing response message.

2. The method of claim 1, further comprising:
   transmitting a second device sensing request message as part of a technology detection process; and
   receiving the first device sensing response message in response to the second device sensing request message.

3. The method of claim 1, wherein the second device sensing response message overwrites the first device sensing response message.

4. The method of claim 1, wherein each of the plurality of remote NFC devices is configured to use NFC-A radio frequency (RF) technology.

5. The method of claim 1, wherein the first and second device sensing response messages are SENS_RES messages as defined in the NFC Forum Digital Protocol specification.

6. The method of claim 1, wherein the second device sensing request message is a SENS_REQ message as defined in the NFC Forum Digital Protocol specification.

7. The method of claim 1, wherein the sleep request message is a SLP_REQ message as defined in the NFC Forum Digital Protocol specification.

8. The method of claim 1, wherein the plurality of remote NFC devices comprise at least one of a reader device, a writer device, a tag, a card, and a peer device.

9. The method of claim 1, further comprising performing single device detection communications with each device that transmitted a device sensing response message to obtain a NFC device identifier (NFCID).

10. A non-transitory computer-readable medium, storing computer-executable code for wireless communications, comprising:
    code for determining that a first device sensing response message includes one or more collisions among a plurality of remote near field communication (NFC) devices;
    code for identifying a first remote NFC device of the plurality of remote NFC devices by performing collision resolution on the first device sensing response message;
    code for transmitting a sleep request message to the first remote NFC device, which causes the first remote NFC device to transition to a sleep state that prohibits the first remote NFC device from responding to a first device sensing request message;
    code for transmitting the first device sensing request message;
    code for receiving a second device sensing response message that includes collisions among the plurality of remote NFC devices;

code for identifying a second remote NFC device of the plurality of remote NFC devices by performing collision resolution on the second device sensing response message;

code for storing the first device sensing response message in a first location in a storage structure, and the second device sensing response message in a second location in the storage structure;

code for receiving a collision free device sensing response message; and code for determining collision free versions of the first and second device sensing response messages by analyzing the first device sensing response message in the first location and the second device sensing response message in the second location in the storage structure using the received collision free device sensing response message.

11. The non-transitory computer-readable medium of claim 10, further comprising:
code for transmitting a second device sensing request message as part of a technology detection process; and
code for receiving the first device sensing response message in response to the second device sensing request message.

12. The non-transitory computer-readable medium of claim 10, wherein the second device sensing response message overwrites the first device sensing response message.

13. The non-transitory computer-readable medium of claim 10, wherein each of the plurality of remote NFC devices is configured to use NFC-A radio frequency (RF) technology.

14. The non-transitory computer-readable medium of claim 10, wherein the first and second device sensing response messages are SENS_RES messages as defined in the NFC Forum Digital Protocol specification.

15. The non-transitory computer-readable medium of claim 10, wherein the second device sensing request message is a SENS_REQ message as defined in the NFC Forum Digital Protocol specification.

16. The non-transitory computer-readable medium of claim 10, wherein the sleep request message is a SLP_REQ message as defined in the NFC Forum Digital Protocol specification.

17. The non-transitory computer-readable medium of claim 10, wherein the plurality of remote NFC devices comprise at least one of a reader device, a writer device, a tag, a card, and a peer device.

18. The non-transitory computer-readable medium of claim 10, wherein the non-transitory computer-readable medium further comprises code for performing single device detection communications with each device that transmitted a device sensing response message to obtain a NFC device identifier (NFCID).

19. An apparatus for communications, comprising:
means for determining that a first device sensing response message includes one or more collisions among a plurality of remote near field communication (NFC) devices;
means for identifying a first remote NFC device of the plurality of remote NFC devices by performing collision resolution on the first device sensing response message;
means for transmitting a sleep request message to the first remote NFC device, which causes the first remote NFC device to transition to a sleep state that prohibits the first remote NFC device from responding to a first device sensing request message;
wherein the means for transmitting is further configured to transmit the first device sensing request message;
means for receiving a second device sensing response message that includes collisions among the plurality of remote NFC devices;
wherein the means for identifying is further configured to identify a second remote NFC device of the plurality of remote NFC devices by performing collision resolution on the second device sensing response message;
means for storing the first device sensing response message in a first location in a storage structure, and the second device sensing response message in a second location in the storage structure;
wherein the means for receiving is further configured to receive a collision free device sensing response message; and
means for determining collision free versions of the first and second device sensing response messages by analyzing the first device sensing response message in the first location and the second device sensing response message in the second location in the storage structure using the received collision free device sensing response message.

20. The method of claim 19, wherein the means for transmitting is further configured to transmit a second device sensing request message as part of a technology detection process; and
wherein the means for receiving is further configured to receive the first device sensing response message in response to the second device sensing request message.

21. The apparatus of claim 19, wherein the second device sensing response message overwrites the first device sensing response message.

22. The apparatus of claim 19, wherein each of the plurality of remote NFC devices is configured to use NFC-A radio frequency (RF) technology.

23. The apparatus of claim 19, wherein the first and second device sensing response messages are SENS_RES messages as defined in the NFC Forum Digital Protocol specification.

24. The apparatus of claim 19, wherein the second device sensing request message is a SENS_REQ message as defined in the NFC Forum Digital Protocol specification.

25. The apparatus of claim 19, wherein the sleep request message is a SLP_REQ message as defined in the NFC Forum Digital Protocol specification.

26. The apparatus of claim 19, wherein the plurality of remote NFC devices comprise at least one of a reader device, a writer device, a tag, a card, and a peer device.

27. The apparatus of claim 19, wherein the means for receiving and means for transmitting are further configured to perform single device detection communications with each device that transmitted a device sensing response message to obtain a NFC device identifier (NFCID).

28. An apparatus for NFC communications, comprising:
a transceiver;
a memory;
a processor coupled to the memory; and
a NFC technology detection module coupled to at least one of the memory or the processor and configured to:
determine that a first device sensing response message includes one or more collisions among a plurality of remote near field communication (NFC) devices; and
identify a first remote NFC device of the plurality of remote NFC devices by performing collision resolution on the first device sensing response message;
wherein the transceiver is configured to:
transmit a sleep request message to the first remote NFC device, which causes the first remote NFC device to transition to a sleep state that prohibits the first remote NFC device from responding to a first device sensing request message;
transmit the first device sensing request message;
receive a second device sensing response message that includes collisions among the plurality of remote NFC devices; and
wherein the NFC technology detection module is further configured to:
identify identifying a second remote NFC device of the plurality of remote NFC devices by performing collision resolution on the second device sensing response message;
wherein the memory is further configured to store the first device sensing response message in a first location in a storage structure, and the second device sensing response message in a second location in the storage structure;
wherein the transceiver is further configured to receive a collision free device sensing response message; and
wherein the NFC technology detection module is further configured to determine collision free versions of the first and second device sensing response messages by analyzing the first device sensing response message in the first location and the second device sensing response message in the second location in the storage structure using the received collision free device sensing response message.

29. The apparatus of claim 28, wherein the transceiver is further configured to:
transmit a second device sensing request message as part of a technology detection process; and
receive the first device sensing response message in response to the second device sensing request message.

30. The apparatus of claim 28, wherein the second device sensing response message overwrites the first device sensing response message in the memory.

31. The apparatus of claim 28, wherein each of the plurality of remote NFC devices is configured to use NFC-A radio frequency (RF) technology.

32. The apparatus of claim 28, wherein the first and second device sensing response messages are SENS_RES messages as defined in the NFC Forum Digital Protocol specification.

33. The apparatus of claim 28, wherein the second device sensing request message is a SENS_REQ message as defined in the NFC Forum Digital Protocol specification.

34. The apparatus of claim 28, wherein the sleep request message is a SLP_REQ message as defined in the NFC Forum Digital Protocol specification.

35. The apparatus of claim 28, wherein the plurality of remote NFC devices comprise at least one of a reader device, a writer device, a tag, a card, and a peer device.

36. The apparatus of claim 28, wherein the NFC technology detection module is further configured to perform single device detection communications with each device that transmitted a device sensing response message to obtain a NFC device identifier (NFCID).

* * * * *